United States Patent
Kim et al.

(10) Patent No.: US 11,157,239 B2
(45) Date of Patent: Oct. 26, 2021

(54) METHOD OF VERIFYING RANDOMNESS OF BITSTREAM AND SYSTEM THEREOF

(71) Applicant: Hongik University Industry-Academia Cooperation Foundation, Seoul (KR)

(72) Inventors: HyungGyoon Kim, Seoul (KR); Hyungmin Cho, Seoul (KR); Changwoo Pyo, Seoul (KR)

(73) Assignee: HONGIK UNIVERSITY INDUSTRY-ACADEMIA COOPERATION FOUNDATION, Seoul (KR)

( * ) Notice: Subject to any disclaimer, the term of this patent is extended or adjusted under 35 U.S.C. 154(b) by 172 days.

(21) Appl. No.: 16/421,657

(22) Filed: May 24, 2019

(65) Prior Publication Data

US 2019/0361678 A1 Nov. 28, 2019

(30) Foreign Application Priority Data

May 24, 2018 (KR) .................. 10-2018-0059172

(51) Int. Cl.
*G06F 7/58* (2006.01)

(52) U.S. Cl.
CPC .................... *G06F 7/588* (2013.01)

(58) Field of Classification Search
CPC ................................. G06F 7/58–588
See application file for complete search history.

(56) References Cited

U.S. PATENT DOCUMENTS 6,604,009 B2 8/2003 Eastty et al.
7,469,014 B2 12/2008 Abe et al.
(Continued)

FOREIGN PATENT DOCUMENTS

KR 100499966 B1 9/2005
KR 100709675 B1 4/2007
(Continued)

OTHER PUBLICATIONS

A. Suciu, I. Nagy, K. Marton and I. Pinca, "Parallel implementation of the NIST Statistical Test Suite," Proceedings of the 2010 IEEE 6th International Conference on Intelligent Computer Communication and Processing, Cluj-Napoca, 2010, pp. 363-368, doi: 10.1109/ICCP.2010.5606412. (Year: 2010).*

(Continued)

*Primary Examiner* — Aimee Li
*Assistant Examiner* — Carlo Waje
(74) *Attorney, Agent, or Firm* — Dinsmore & Shohl LLP; Yongsok Choi, Esq.

(57) ABSTRACT

A method of verifying randomness of a bitstream is disclosed. The method includes receiving a bitstream consisting of n consecutive bits and dividing the bitstream into a plurality of bit blocks. In this case, n is a natural number of two or greater, each of the bit blocks consists of m consecutive bits, and m is a natural number of two or greater and is smaller than n. Further, the method includes allocating the plurality of bit blocks to a plurality of core groups in a graphics processing unit (GPU), processing the allocated bit blocks in the plurality of core groups in parallel, calculating random number level values of the allocated bit blocks, and determining whether the bitstream has randomness based on the calculated random number level values. Each of the core groups includes a plurality of cores capable of performing identical or similar tasks without separate synchronization.

7 Claims, 10 Drawing Sheets

(56) References Cited

U.S. PATENT DOCUMENTS

| | | | |
|---|---|---|---|
| 7,796,061 | B2 | 9/2010 | Kee |
| 2003/0158876 | A1* | 8/2003 | Hars .................. G06F 7/58 708/250 |
| 2003/0187598 | A1* | 10/2003 | Hars .................. G06F 7/58 702/75 |
| 2009/0037787 | A1* | 2/2009 | Vasyltsov ........... G07C 15/006 714/739 |
| 2015/0149519 | A1* | 5/2015 | Kokubo ............... G06F 7/588 708/250 |
| 2018/0108105 | A1* | 4/2018 | Duesterwald ........ G06T 1/20 |
| 2020/0320214 | A1* | 10/2020 | Harris ................ H04L 63/0428 |

FOREIGN PATENT DOCUMENTS

| | | | |
|---|---|---|---|
| KR | 100801630 | B1 | 2/2008 |
| KR | 101583471 | B1 | 1/2016 |

OTHER PUBLICATIONS

A. Suciu, L. Zegreanu and C. T. Zima, "Statistical testing of random number sequences using CUDA," Proceedings of the 2010 IEEE 6th International Conference on Intelligent Computer Communication and Processing, Cluj-Napoca, 2010, pp. 369-374, doi: 10.1109/ICCP.2010.5606413. (Year: 2010).*

M. Osama and A. Hussein, "A highly-effective parallelization of statistical time-consuming tests of Pseudorandom Number Generators using CUDA," 2015 Tenth International Conference on Computer Engineering & Systems (ICCES), Cairo, 2015, pp. 8-15, doi: 10.1109/ICCES.2015.7393009. (Year: 2015).*

I. V. Chugunkov et al., "Parallelization of test for assessing pseudorandom number generators using CUDA technology," 2015 IEEE NW Russia Young Researchers in Electrical and Electronic Engineering Conference (EIConRusNW), St. Petersburg, 2015, pp. 60-64, doi: 10.1109/EICon (Year: 2015).*

Rukhin et al. in "A Statistical Test Suite for Random and Pseudorandom Number Generators for Cryptographic Applications", Special Publication 800-22 Rev. 1a, 2010. Retrieved from the internet <https://nvlpubs.nist.gov/nistpubs/Legacy/SP/nistspecialpublication800-22r1a.pdf> (Year: 2010).*

Kim et al. in "GPU-based acceleration of the Linear Complexity Test for random number generator testing", on Journal of Parallel and Distributed Computing, vol. 128, Jun. 2019, pp. 115-125. https://doi.org/10.1016/j.jpdc.2019.01.011 (Year: 2019).*

Mittal et al. in "A Survey of CPU-GPU Heterogeneous Computing Techniques", on ACM Computing Surveys, Jul. 2015, Article No. 69. https://doi.org/10.1145/2788396 (Year: 2015).*

A. Suciu, K. Marton, I. Nagy and I. Pinca, "Byte-oriented efficient implementation of the NIST statistical test suite," 2010 IEEE International Conference on Automation, Quality and Testing, Robotics (AQTR), Cluj-Napoca, 2010, pp. 1-6, doi: 10.1109/AQTR.2010.5520837. (Year: 2010).*

K. Márton, V. Bâja and A. Suciu, "Parallel implementation of the matrix rank test for randomness assessment," 2014 IEEE 10th International Conference on Intelligent Computer Communication and Processing (ICCP), Cluj Napoca, 2014, pp. 317-321, doi: 10.1109/ICCP.2014.6937015. (Year: 2014).*

Patterson et al. in "Computer Organization and Design: The Hardware/Software Interface", 5th Edition, 2014, pp. 2-61 aand pp. 524-563. (Year: 2014).*

* cited by examiner

METHOD OF VERIFYING RANDOMNESS OF BITSTREAM AND SYSTEM THEREOF

ACKNOWLEDGEMENT

This work was supported in part by the National Research Foundation of Korea (NRF) grant funded by the Korea government Ministry of Education (NRF-2015R1D1A1A0105771), the National Research Foundation of Korea (NRF) grant funded by the Korea government (MSIT) (NRF-2017R1C1B5017414), and Institute for Information & communications Technology Promotion (IITP) grant by the Korea government (MSIT) (No. 2019-0-00533, Research on CPU vulnerability detection and validation).

CROSS-REFERENCE TO RELATED APPLICATION

This application claims priority to and the benefit of Korean Patent Application No. 2018-0059172, filed on May 24, 2018, the disclosure of which is incorporated herein by reference in its entirety.

BACKGROUND

1. Field

The present disclosure relates to a method for verifying randomness of a bitstream, and more particularly, to a bitstream randomness verification method capable of improving a processing speed required for verifying randomness of a bitstream by processing the bitstream in parallel using a plurality of cores of a graphics processing unit (GPU).

2. Discussion of Related Art

Random numbers generated by a random number generator should be verified on whether they have arbitrariness or randomness in order to be used in application fields. For example, a statistical verification program package including a plurality of tests (e.g., 15 tests) developed by National Institute of Standards and Technology (NIST) have been most widely used for verification of random numbers. However, the processing speed of the statistical verification program package is so slow such that it has become a serious obstacle to the randomness test for random numbers using the statistical verification program package.

In order to accelerate the slow processing speed of the statistical verification program package, a variety of research studies have been performed on optimization of the tests in the statistical verification program package. In particular, research has been conducted to reduce the processing time of the Linear Complexity Test, which takes the most processing time out of the 15 tests provided by the statistical verification program package. For example, according to one study, the processing time of the Linear Complexity Test was improved by deleting parts unnecessary for Berlekamp-Massey (BM) algorithm to be executed in the Linear Complexity Test, or, in the BM algorithm, grouping several bits in unit of one word and sequentially calculating the words in a single central processing unit (CPU). However, even though the processing time of the Linear Complexity Test has been accelerated, a great deal of processing time is still required to verify randomness of random numbers.

SUMMARY

Embodiments disclosed herein relate to a bitstream randomness verification method capable of improving a processing speed for verifying randomness of a bitstream by dividing the bitstream into bit blocks, allocating the divided bitstream to a plurality of cores of a graphics processing unit (GPU), and processing the allocated bitstream in parallel.

The present disclosure may be implemented in various ways including a method, a system, an apparatus, or a storage medium including instructions for executing the method.

According to one embodiment of the present disclosure, a method of verifying randomness of a bitstream includes receiving a bitstream consisting of n consecutive bits and dividing the bitstream into a plurality of bit blocks. In this case, n is a natural number of two or greater, each of the bit blocks consists of m consecutive bits, and m is a natural number of two or greater and is smaller than n. Further, the method includes allocating the plurality of bit blocks to a plurality of core groups in a graphics processing unit (GPU), processing the allocated bit blocks in the plurality of core groups in parallel, calculating random number level values of the allocated bit blocks, and determining whether the bitstream has randomness based on the calculated random number level values. Each of the core groups includes a plurality of cores capable of performing identical or similar tasks without separate synchronization.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, embodiments of the present disclosure will be described in detail with reference to the accompanying drawings. It will be readily apparent to those of ordinary skill in the art, however, that the detailed description given herein with respect to these drawings is for purposes of illustration and that the present disclosure extends beyond these limited embodiments.

Figure 1:
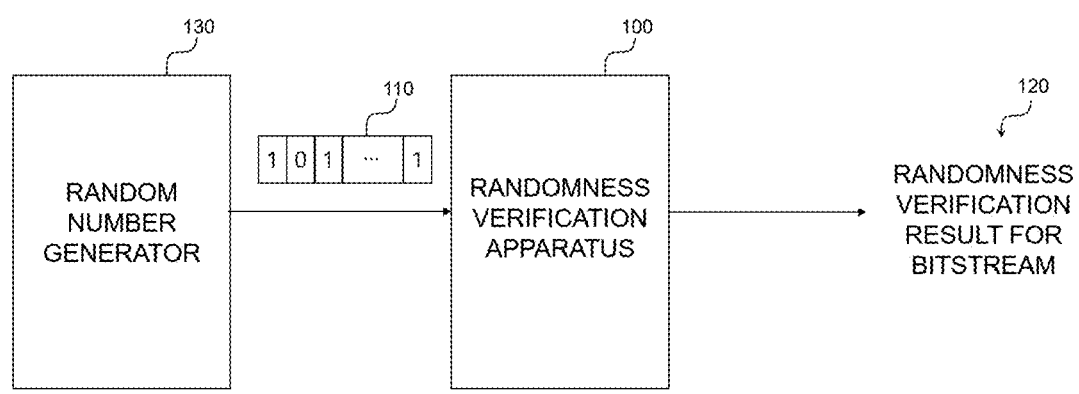
FIG. 1 is a block diagram schematically showing a randomness verification apparatus according to an embodiment of the present disclosure.

FIG. 1 is a block diagram schematically showing a randomness verification apparatus 100 according to an embodiment of the present disclosure. The randomness verification apparatus 100 may be configured to receive a bitstream 110 consisting of n consecutive bits that may be generated by a random number generator 130. Here, n may refer to a natural number greater than or equal to 2. The random number generator 130 may be any random number generation apparatus capable of generating a random number. Also, the size of the generated random number may vary with the generated random number. For example, the size of the bitstream 110 may range from 160 Mb to 2 Gb.

According to an embodiment of the present disclosure, the randomness verification apparatus 100 may be configured to divide the bitstream 110 into a plurality of bit blocks in order to verify the randomness of the received bitstream 110. Here, each of the plurality of bit blocks may consist of m consecutive bits, and m may be a natural number greater than or equal to two and less than n. The plurality of bit blocks may be allocated to cores of a graphics processing unit (GPU) and processed in parallel according to the architecture of the GPU. A single core may be referred to as a unit included in the GPU and capable of processing a single thread.

According to an embodiment of the present disclosure, each of the plurality of bit blocks are divided into a plurality of words, and each of the plurality of words may be allocated to the cores of the GPU and processed in parallel. The parallel processing will be described in detail below with reference to FIGS. 5 to 9. Through the parallel processing, a random number level value for each of the allocated bit blocks may be calculated, and a randomness verification result of the bitstream 110 may be determined depending on whether the calculated random number level value satisfies a predetermined statistical criterion.

Figure 2:
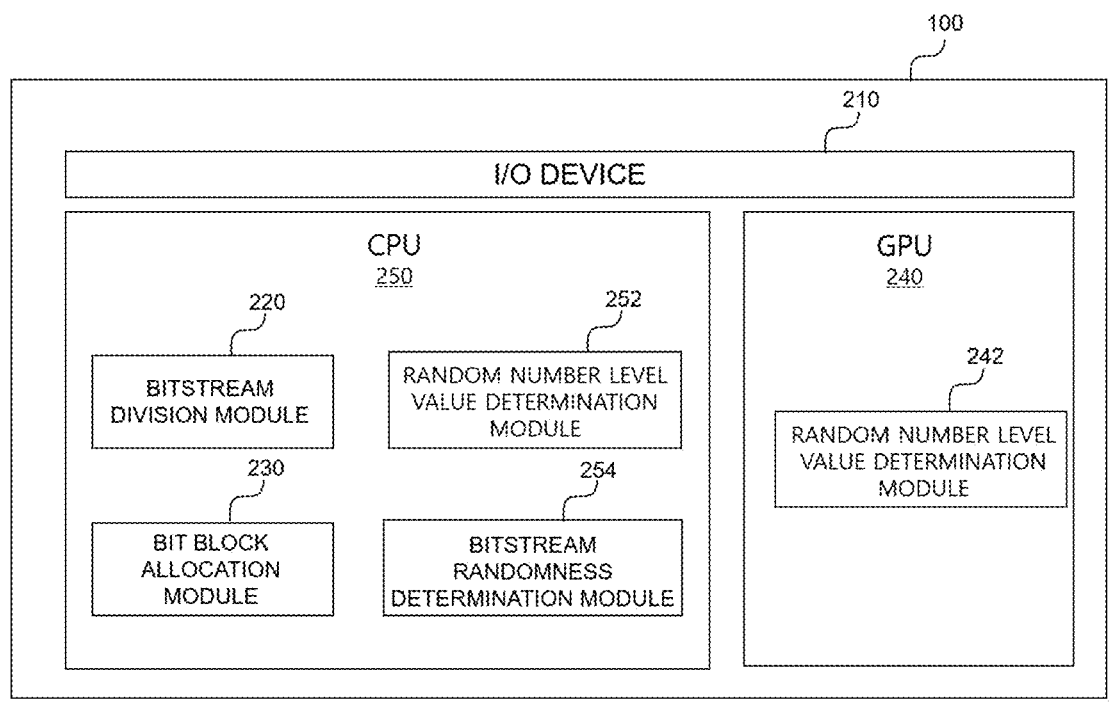
FIG. 2 is a block diagram showing internal elements of the randomness verification apparatus according to an embodiment of the present disclosure.

FIG. 2 is a block diagram showing internal elements of the randomness verification apparatus 100 according to an embodiment of the present disclosure. The randomness verification apparatus 100 may include an input/output (I/O) apparatus 210, a GPU 240, and a CPU 250. The GPU 240 may be configured to include a random number level value determination module 242, while the CPU 250 may include a bitstream division module 220, a bit block allocation module 230, a random number level value determination module 252, and a bitstream randomness determination module 254. In this embodiment, it is shown that both of the GPU 240 and CPU 250 may include the random number level value determination modules 242 and 252, respectively, however, the random number level value determination module 242 may be included in only the GPU 240.

The I/O apparatus 210 may be configured to receive a random number generated by the random number generator 130, i.e., a bitstream, and output a randomness verification result of the bitstream. According to an embodiment of the present disclosure, the randomness verification apparatus 100 may receive the bitstream from the random number generator 130. For example, the bitstream may be received through a communication module capable of communicating with a bus inside a computer and/or an external apparatus. As another example, the randomness verification apparatus 100 may receive the bitstream from a user through the I/O device 210. According to an embodiment of the present disclosure, the randomness verification apparatus 100 may be configured to output the randomness verification result through the I/O device 210 after the randomness of the bitstream is verified. For example, the I/O device 210 may include an input device such as a touchscreen, a keypad, a touchpad, etc. and an output device such as s display screen, speaker, etc.

The bitstream division module 220 of the CPU 250 may be configured to receive a bitstream consisting of n consecutive bits (here, n is a natural number greater than or equal to two) through the I/O device 210, an internal bus (not shown), and/or a communication module (not shown) and divide the bitstream into m bit blocks (m is a natural number greater than or equal to two or less than n). According to an embodiment of the present disclosure, the received bitstream may be divided into a certain number of bit blocks in order from the first bit to the last bit, that is, in sequential order. For example, the received bitstream may be divided into a plurality of bit blocks based on one of 500 or 5000 bits. According to another embodiment, the received bitstream may be divided into bit blocks with various numbers of bits (e.g., a plurality of bits ranging from 500 to 5000 bits).

According to an embodiment of the present disclosure, the bitstream division module 220 may be configured to divide the received bitstream into a plurality of bit blocks and divide each of the bit blocks into a plurality of words for parallel-processing. In this case, the number of the bits of each of the plurality of the words may be a multiple of 32. For example, the number of the bits of the words may be 32 or 64. Also, when the division of the plurality of bit blocks is performed, each of the plurality of words may have a certain number of bits. Alternatively, each of the plurality of words may have various bits after the division. The plurality of bit blocks and/or the plurality of words divided by the bitstream division module 220 may be provided to the bit block allocation module 230.

The bit block allocation module 230 may be configured to allocate the received bit blocks to a plurality of core groups in the GPU 240. Here, each of the plurality of core groups may include a plurality of cores capable of performing the same or similar tasks in a unit scheduling or without separate synchronization between the cores in each of the plurality of core groups. Hereinafter, the synchronization may refer to a case where a separate task (e.g., execution of a synchronization command) consuming additional time is necessary in order to adjust task order or processing time when data is exchanged between tasks or threads performed by a plurality of cores operating independently. For example, when each of the plurality of the cores in each of the plurality of core groups performs its thread, it is possible to improve the processing speed by using a shared memory that may be used to share data during execution of a plurality of threads (thread blocks) without access to a local memory, which reduces a processing speed. In this case, the core group may vary with the specifications of various GPUs produced by manufacturers. According to an embodiment of the present disclosure, each of the plurality of core groups may refer to a warp or a streaming multiprocessor used by a GPU of NVIDIA Corporation. For example, one warp may include 32 cores, each of which is capable of running a single thread. The 32 cores included in the one warp may perform the same or similar tasks without separate synchronization. According to another embodiment, each of the plurality of groups may refer to a wavefront of AMD Corporation, and one wavefront may include 64 cores capable of executing 64 threads.

The bit block allocation module 230 may be configured to allocate one bit block to one core group. According to an embodiment of the present disclosure, each of the plurality of bit blocks may be allocated to each of the plurality of core groups in the order in which the bit blocks are arranged in the bitstream. When the number of the bit blocks into which the bitstream is divided is greater than the number of core groups, one or more bit blocks may be allocated to each of the plurality of core groups.

The bit block allocation module 230 may be configured to allocate each of the received words to each of a plurality of cores of the GPU 240. According to an embodiment of the present disclosure, a plurality of words in one bit block may be allocated to cores of one core group of the GPU. In this case, when the number of the words in one bit block is greater than the number of the cores in a single core group, a plurality of words may be allocated to one core. In this regard, a method of allocating a plurality of words to cores in a single core group will be described in detail with reference to FIG. 7. In FIG. 2, the bitstream division module 220 is described as a module that divides a plurality of bit blocks into a plurality of words, but the present disclosure is not limited thereto. The bit block allocation module 230 may be configured to receive a plurality of bit blocks into which a bitstream is divided from the bitstream division module 220, divide each of the received bit blocks into a plurality of words, and then allocate each of the plurality of words to each of the plurality of cores of the core groups of the GPU 240.

The random number level value determination module 242 of the GPU 240 may be implemented by the cores in the plurality of cores of the GPU 240. In order to generate a random number level value of one bit block allocated to a single core group, cores in the single core group may be used. According to an embodiment of the present disclosure, in order to determine a random number level value of a bit block consisting of given words, one or more words are allocated to each core in a core group, and distribution processing may be executed in units of cores through parallel processing in units of words. A random number level value of one bit block may be determined based on results obtained by performing parallel processing in each core in units of words. Also, when one or more bit blocks are allocated to each core group, a random number level value of each bit block may be determined. One of a variety of algorithms well known in the random number verification field may be used to determine a random number level value for one bit block. For example, Berlekamp-Massey (BM) algorithm may be used to determine a random number level value. As described above, the random number level value of each bit block in the bitstream generated by the random number level value determination module 242 may be provided to the bitstream randomness determination module 254.

According to an embodiment of the present disclosure, the random number level value of each bit block in the bitstream may be generated using several tests of the statistical verification program package of the National Institute of Standards (NITS). Among the tests, a Linear Complexity Test may be used to determine such a random number level value. The Linear Complexity Test may be executed based on the BM algorithm. The BM algorithm may calculate the length of a linear-feedback shift register (LFSR) of a bit sequence in order to verify randomness of the bit sequence (e.g., a word, a bit block, or a bitstream).

According to an embodiment of the present disclosure, the shortest LFSR of a bit sequence (e.g., a bitstream, a bit block, or a word) may be determined through the BM algorithm. For example, in an $i^{th}$ iteration, the BM algorithm may determine the shortest LFSR that generates up to an $i^{th}$ bit sequence of a bit block. In this case, L represents the length of the shortest LFSR at the present stage during processing through C(x). Here, $C(x)=\Sigma_{k=0}^{L}c_k x^k$ and c0=1.

According to an embodiment of the present disclosure, the random number level value determination module 242 of the GPU 240 may collect the length of an LSFR for each of a plurality of bit block by applying the BM algorithm to the plurality of bit blocks. Also, the random number level value determination module 242 of the GPU 240 may be configured to perform parallel-processing in units of words of each bit block using the BM algorithm. A method of exchanging data and a method of collecting random number level values which are required when the bit blocks are processed in parallel in each core of the GPU in units of words using the BM algorithm will be described in detail with reference to FIGS. 8 and 9. The bitstream randomness determination module 254 of the CPU 250 may be configured to determine randomness of the bitstream based on the received random number level value of each of the bit blocks. One of a variety of statistical verification methods well known in the random number verification field may be used to verify the randomness. For example, the chi-square ($\chi^2$) distribution test may be used as the statistical verification method. Then, the bitstream randomness verification result determined by the bitstream randomness determination module 254 may be output through the I/O device 210. For example, in order to determine the random number level value of each bit block of the bitstream, when the length of an LSFR of each bit block is determined through the BM algorithm, the bitstream randomness determination module 254 may collect the lengths of LSFRs and then analyze a statistical distribution of the collected lengths. For example, when the statistical distribution is greater than or equal to a predetermined threshold distribution, the bitstream randomness determination module 254 may determine that the bitstream has randomness.

The bit block allocation module 230 may be configured to allocate a portion of the plurality of bit blocks, into which the bitstream is divided, to the random number level value determination module 252 of the CPU 250 as well as that of the GPU 240. The random number level value determination module 252 of the CPU 250 may be implemented by the plurality of cores of the CPU 250. According to an embodiment of the present disclosure, the bit block allocation module 230 may allocate the plurality of bit blocks to the random number level value determination module 242 of the GPU 240 in sequential order starting from the bit block including the first bit (i.e., in the order from the first bit of the bitstream to the last bit) and may determine random number level values of bit blocks allocated to each of the plurality of cores by using a corresponding one of the plurality of cores of the GPU 240. At the same time, the bit block allocation module 230 may allocate the plurality of bit blocks to the random number level value determination module 252 of the CPU 250 in reverse order starting from the bit block including the last bit (i.e., in the order from the last bit of the bitstream to the first bit), and the random number level value determination module 252 may determine random number level values of bit blocks allocated to each of the plurality of cores by using a corresponding one of the plurality of cores of the CPU 250. According to another embodiment, the bit block allocation module 230 may allocate the bit blocks to the random number level value determination module 252 of the CPU 250 in sequential order starting from the bit block including the first bit and may allocate the bit blocks to the random number level value determination module 242 of the GPU 240 in reverse order starting from the bit block including the last bit. Then, the random number level values determined by the random number level value determination module 242 of the GPU 240 and the random number level value determination module 252 of the CPU 250 may be provided to the bitstream randomness determination module 254 for verifying the randomness of the bitstream.

Figure 3:
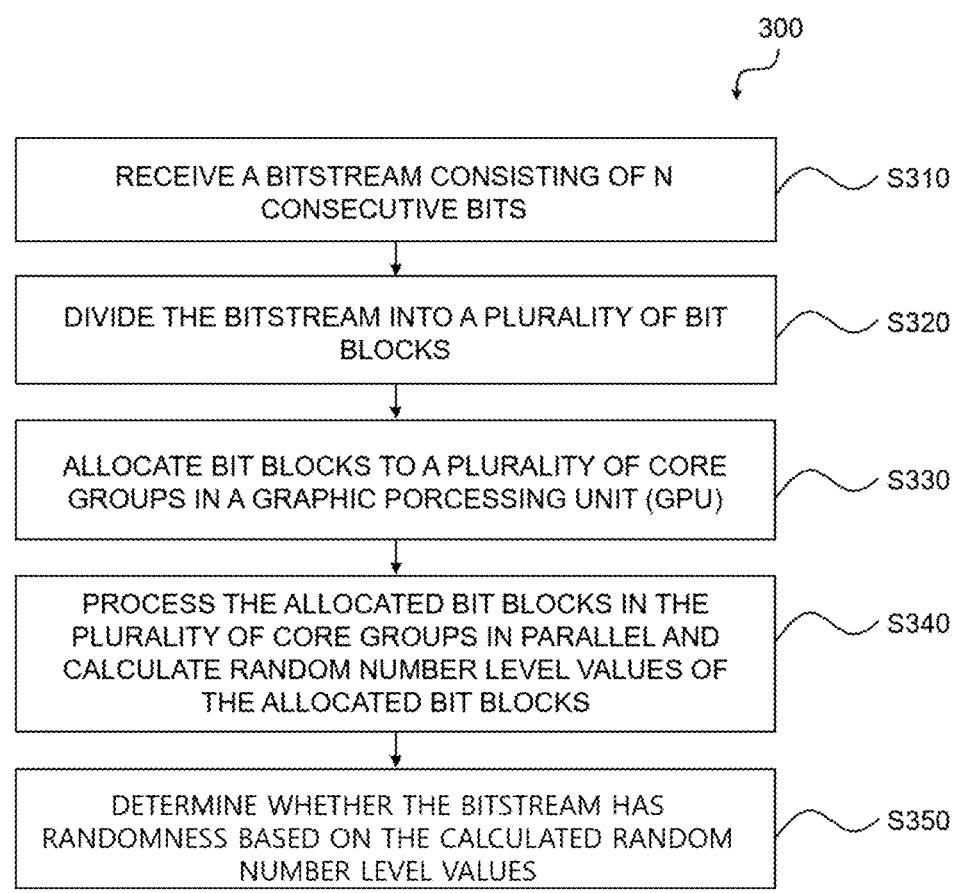
FIG. 3 is a flowchart showing a randomness verification method according to an embodiment of the present disclosure.

FIG. 3 is a flowchart showing a randomness verification method 300 according to an embodiment of the present disclosure. In operation S310, the randomness verification apparatus 100 may receive a bitstream consisting of n consecutive bits. In operation S320, the randomness verification apparatus 100 may divide the bitstream into a plurality of bit blocks. For example, the plurality of bit blocks may have a size ranging from 500 bits to 5000 bits.

In operation S330, each of the plurality of bit blocks may be allocated to each of a plurality of core groups in the GPU 240. In operation S340, a random number level value of each of the allocated bit blocks may be calculated by processing the bit blocks allocated to the plurality of core groups in parallel. According to an embodiment of the present disclosure, the random number level value determination module 242 of the GPU 240 may calculate the random number level values of the bit blocks using cores of each of the plurality of core groups in the GPU. In operation S350, it may be determined whether the bitstream has randomness or not based on the random number level values calculated for bit blocks. According to an embodiment of the present disclosure, when the statistical analysis value of the random number level value of each bit block satisfies a predetermined random number condition, it may be determined that the bitstream has randomness.

Figure 4:
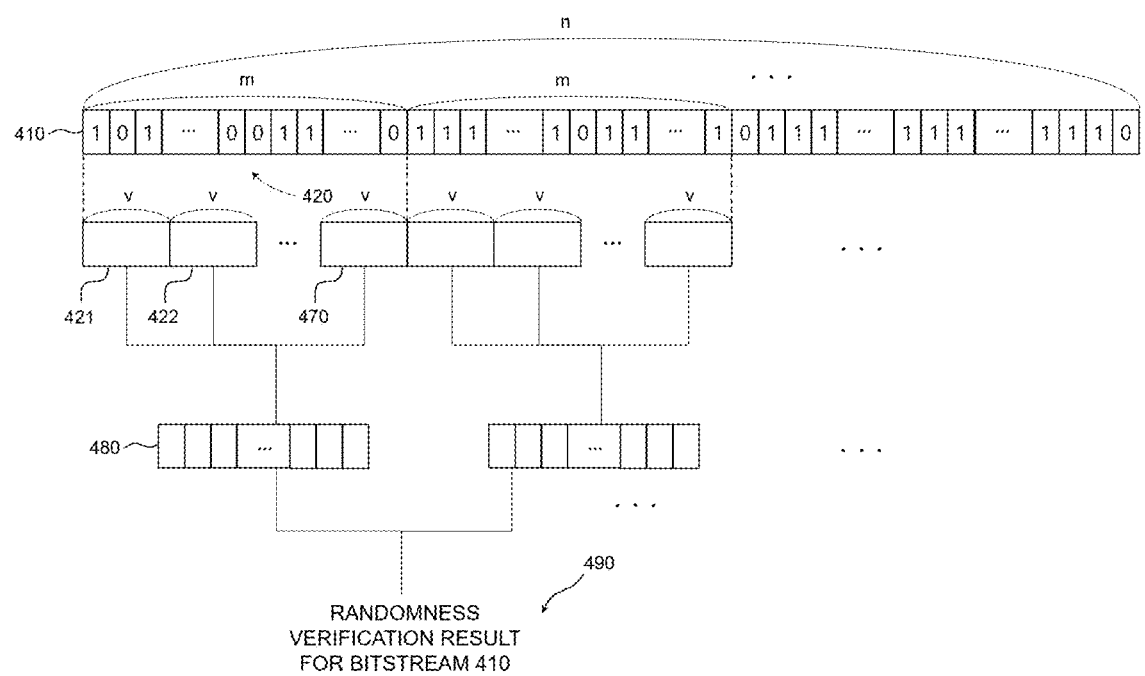
FIG. 4 is a flow diagram illustrating a method of verifying randomness of a bitstream according to an embodiment of the present disclosure.

FIG. 4 is a flow diagram illustrating a method of verifying randomness of a bitstream 410 according to an embodiment of the present disclosure. In order to verify whether the bitstream 410 has randomness as a random number, the bitstream division module 220 of the randomness verification apparatus 100 may receive the bitstream 410 consisting of n bits as the random number and divide the bitstream 410 into a plurality of bit blocks, each of which consists of m bits. For example, m may range from 100 bits to 10,000 bits. Then, as shown in FIG. 4, each of the bit blocks may be divided into a plurality of words, each of which consists of v bits. According to an embodiment of the present disclosure, a bit block 420 may be divided into 50 words 421 to 470, each of which consists of v bits. Further, the other bit blocks may be divided into a plurality of words in the same manner.

The random number level value determination modules 242 and/or 252 may receive the plurality of words 421 to 470 and determine a random number level for each of the bit blocks.

The bitstream randomness determination module 254 may collect the random number level values of the bit blocks. Referring to FIG. 4, for example, the bitstream randomness determination module 254 may collect the random number level values of the plurality of words 421 to 470 into which the bit block 420 is divided, and then determine the random number level value 480 for the bit block 420. In this manner, the bitstream randomness determination module 254 may determine the random number level values of all the bit blocks of the bitstream 410 and verify randomness of the bitstream 410 based on the random number level values of all the bit blocks. For example, when the random number level values of all the bit blocks are greater than or equal to a predetermined statistical distribution value, it may be determined that the randomness of the bitstream 410 is verified.

In order to divide the bitstream in units of bit blocks, and further, in units of words, collect random number level values of the bit blocks and words using a GPU and/or a CPU, and then verify randomness of the bitstream, an experiment for collecting the random number level values (e.g., the length of the LSFR) for the bit blocks and verifying the randomness of the bitstream based on the BM algorithm of Linear Complexity Test was performed. As a result of the experiment, the processing speed was about 4,000 times that of Linear Complexity Test conventionally provided by NIST.

Figure 5:
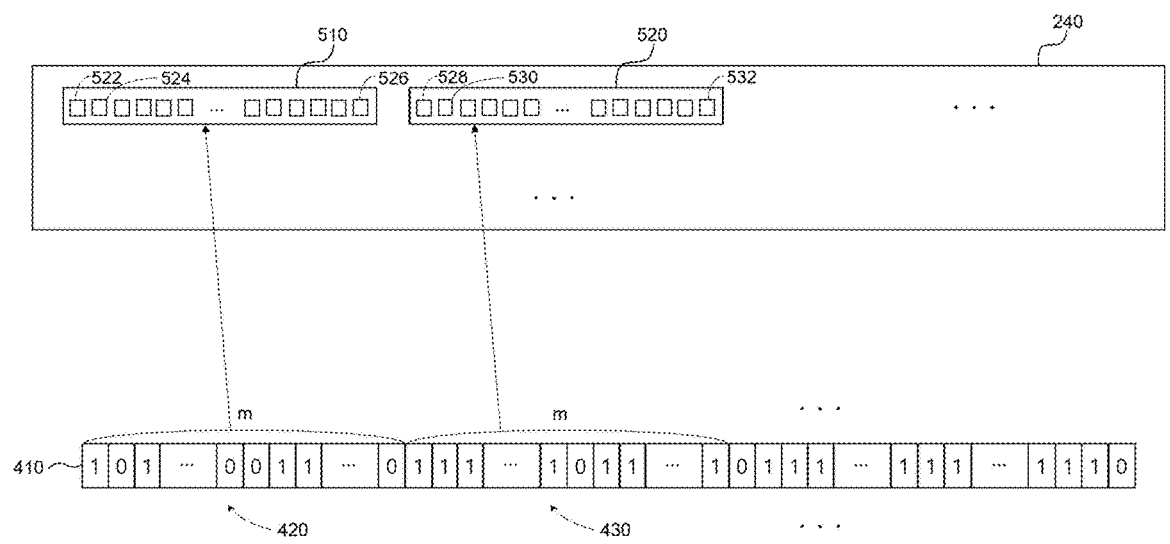
FIG. 5 is a diagram showing a graphics processing unit (GPU) including a plurality of core groups to which a plurality of bit blocks of a bitstream are to be allocated for verifying randomness of the bitstream according to an embodiment of the present disclosure.

FIG. 5 is a diagram showing a GPU 240 including a plurality of core groups 510 and 520 to which a plurality of bit blocks 420 and 430 of a bitstream 410 are to be allocated for verifying randomness of the bitstream 410 according to an embodiment of the present disclosure. As shown in FIG. 5, the GPU 240 may include a plurality of core groups. In FIG. 5, as an example, only two core groups 510 and 520 in the GPU 240 are explicitly shown. However, three or more core groups may be included in the GPU 240. The number of the core groups in the GPU 240 may vary with an architecture of the GPU 240.

Each of the plurality of core groups may include a plurality of cores. As shown in FIG. 5, a first core group 510 may include a plurality of cores including three cores 522, 524, and 526, and a second core group 520 may include a plurality of cores including three cores 528, 530, and 532. For example, when the core groups 510 and 520 are warps of a CUDA apparatus manufactured by Nvidia Corporation, each core group may include 32 cores.

Each of the bit blocks into which the bitstream 410 is divided may be allocated to each of the plurality of core groups of the GPU 240. When one bit block is processed between the plurality of core groups (e.g., the plurality of warps) in a distributive manner, a separate synchronization process between the plurality of core groups is required, thus reducing the processing speed. However, when a plurality of threads are processed in one core group, the threads may be processed as one thread block, i.e., one-time scheduling. As such, separate synchronization is not required as is the case in which there is substantially no overhead for the processing speed when one bit block is processed by one core group. Accordingly, it is possible to greatly improve the processing speed required for determining the random number level value of the bit block.

According to an embodiment of the present disclosure, the bit block 420 including the first bit of the bitstream 410 may be allocated to the first core group 510 of the GPU 240. In this manner, the next bit block 430 may be allocated to the next core group 520 of the GPU 240, and a subsequent bit block 430 may be allocated to a subsequent core group. If the number of the bit blocks of the bitstream 410 is greater than the number of the core groups of the GPU 240, the bit block allocation module 230 may allocate bit blocks that have not been allocated to the core groups of the GPU 240 in sequential order staring from the first core group to subsequent core groups. Otherwise, the bit block allocation module 230 may allocate two or more bit blocks in sequential order starting from the first core group to subsequent core groups of the GPU 240 so that there are no unallocated bit blocks when the bit blocks are allocated to the core groups of the GPU 240. For example, when the number of the bit blocks of the bitstream 410 is 49 and the number of the core groups of the GPU 240 is 24, the bit block allocation module 230 may allocate the first three bit blocks to the first core group of the GPU 240 and then may sequentially allocate each of two bit blocks of the remaining bit blocks to each of the other core groups (i.e., starting from the second core group to the last core group of the GPU 240).

Figure 6:
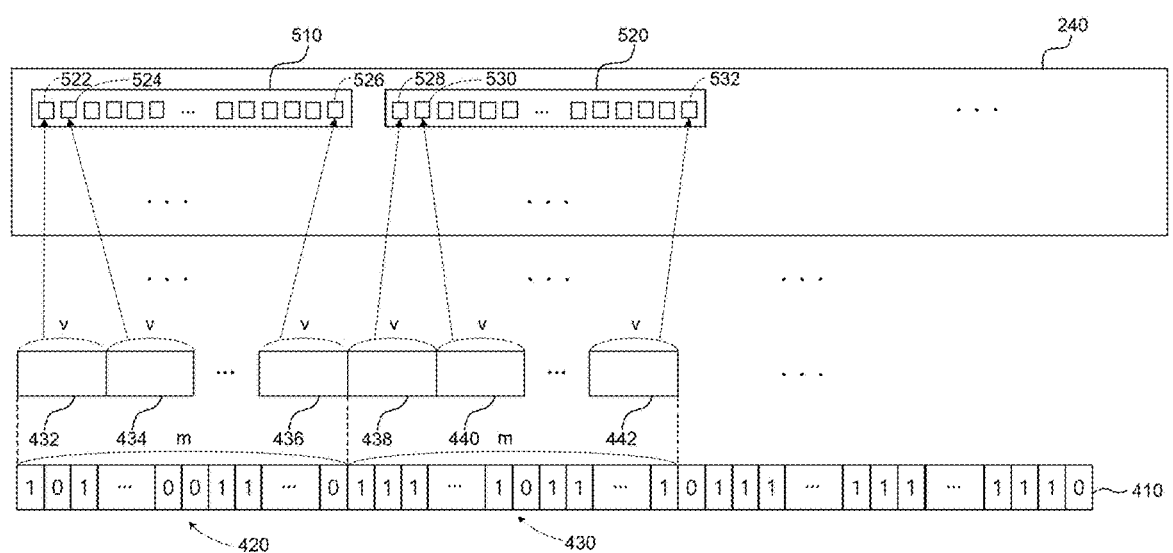
FIG. 6 is a diagram showing the GPU including a plurality of cores to which a plurality of words of a bitstream are to be allocated to verify randomness of the bitstream according to an embodiment of the present disclosure.

FIG. 6 is a diagram showing a GPU 240 including a plurality of cores 522, 524, 526, 528, 530, and 532 to which a plurality of words 432, 434, 436, 438, 440, and 442 of a bitstream 410 are to be allocated for verifying randomness of the bitstream 410, according to an embodiment of the present disclosure. When each bit block is processed in one thread executed by a core, the maximum size of a register space available to the thread may be exceeded, and thus it is possible to reduce the entire processing speed. In order to prevent the reduction in speed, each bit block may be divided into words suitable for a register space that can be used by a thread of each core. For example, one bit block may be divided into words, each of which consists of 64 bits, which may be a word size suitable for one core in a warp.

According to an embodiment of the present disclosure, a plurality of words into which each bit block of the bitstream 410 is divided may be allocated to cores of a core group of the GPU 240 to which a corresponding bit block is to be allocated. The random number level value determination module 242 of the GPU 240 may perform parallel processing by using a thread of each of the cores to determine a random number level value of the bit block.

The words of the bit block may be allocated to the cores of an allocated core group in sequential order. According to an embodiment of the present disclosure, as shown in FIG. 6, when the number of the words included in the bit block is equal to the number of the cores of the core group, one word of the bit block may be allocated to one core in sequential order. For example, the first word 432 and the second word 434 of the bit block 420 may be allocated to the first core 522 and the second core 524 of the core group 510, respectively. The last word 436 may be allocated to the last core 526.

Figure 7:
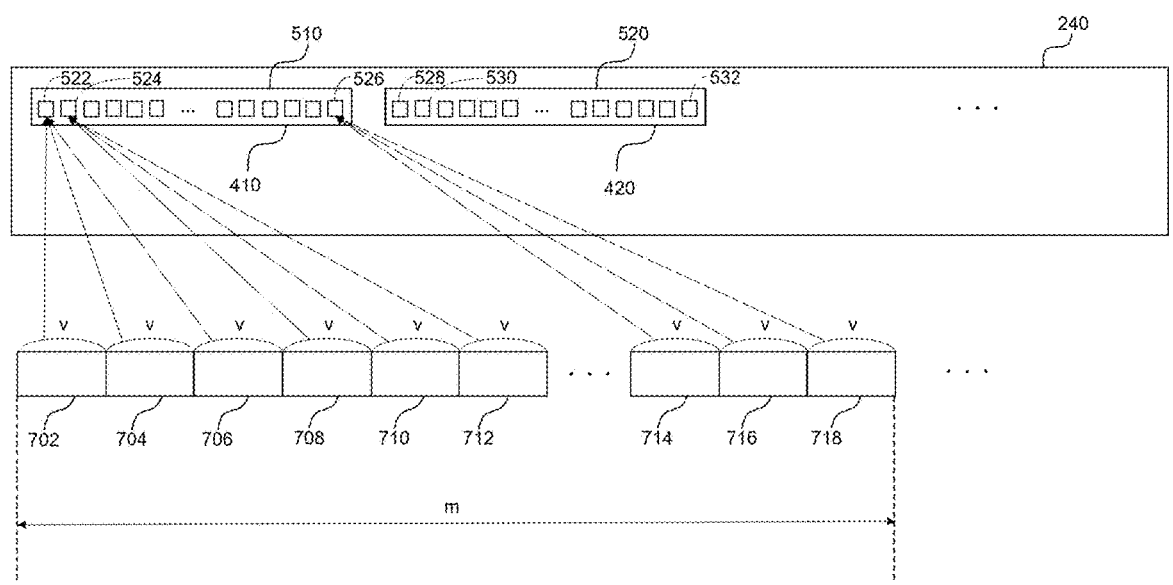
FIG. 7 is a diagram showing the GPU including a plurality of cores to which a plurality of words of a bitstream are to be allocated for verifying randomness of the bitstream according to another embodiment of the present disclosure.

According to another embodiment, when the number of the words included in the bit block is different from the number of the cores of the core group, one or more words may be allocated to one core group. In an embodiment, as shown in FIG. 7, when the number of the words included in the bit block is three times the number of the cores of the core group, three words may be allocated to each core. For example, the first to third words 702, 704, and 706 may be allocated to the first core 522 of the core group, the fourth to sixth words 708, 710, and 712 may be allocated to the second core 524 of the core group, and the last three words 714, 716, and 718 may be allocated to the last core 526 of the core group.

In order to calculate the number of the words allocated to each of cores included in one core group on a bit basis, Equation 1 below may be used.

$$N = \left\lceil \frac{\left\lceil \frac{m}{v} \right\rceil + E}{L} \right\rceil,$$ [Equation 1]

where N is the number of words allocated to each core included in each of a plurality of core groups, m is the number of bits of each bit block, v is the number of bits of the words, E is 0 when v mod (m mod v) is equal to 0 and is 1 when v mod (m mod v) is not equal to 0, and L is the number of the cores included in each of the plurality of core groups.

Figure 8:
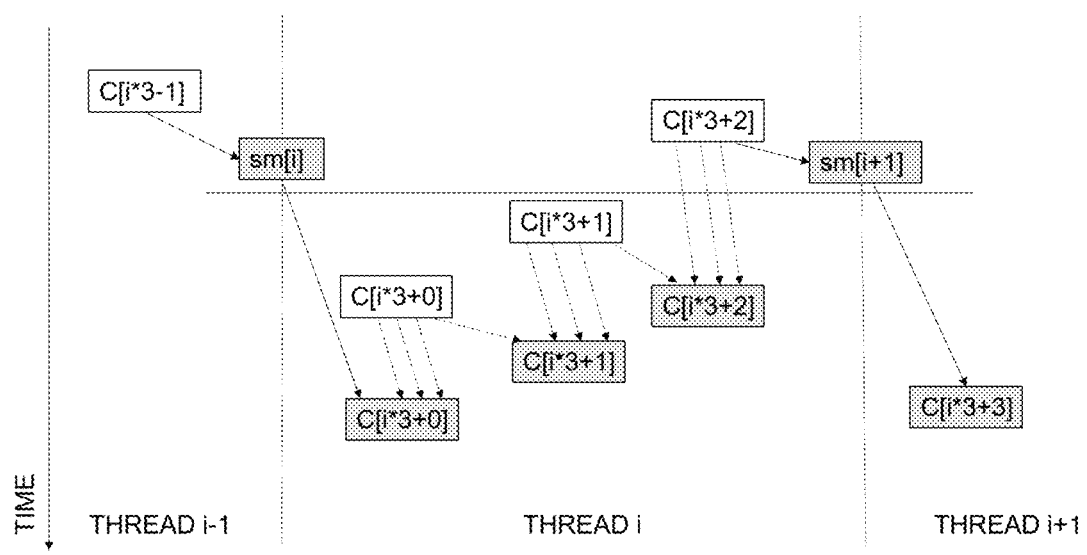
FIG. 8 is a block diagram illustrating a method of exchanging data between threads for processing a plurality of words of a bitstream in parallel through the Berlekamp-Massey (BM) algorithm using a shared memory according to an embodiment of the present disclosure.

FIG. 8 is a block diagram illustrating a method of exchanging data between threads for processing a plurality of words of a bitstream in parallel through a BM algorithm using shared memories according to an embodiment of the present disclosure. In FIG. 8, it is assumed that each three word in one bit block is allocated to each thread i−1, i, and i+1 according to the result calculated according to the above equation. In FIG. 8, C is a value of the currently shortest LFSR, sm is a shared memory, and a block in gray indicates that a shared memory is occupied.

According to an embodiment of the present disclosure, FIG. 8 shows a method of determining random number level values of three consecutive words when the words are processed on one thread using the BM algorithm. For example, in FIG. 8, a sharing method for the threads may be used in the r-shift function. The r-shift function is a function that may determine a C value of a current word and shift the C value of the current word to determine a C value of the next word when randomness of bits is determined in units of words. That is, the function may allow the threads to determine the C value of the next word based on the C value of the current word. As shown in FIG. 8, when C values of three current words are calculated on one thread i, a C value of a previous word processed on the previous thread and stored in a shared memory may be used. When a C value of a word are calculated on the next thread i+1, the C value of the previous word processed on the current tread i may be used. Through this calculation method, a plurality of words into which one bit block is divided may be allocated to cores of one core group and processed under one-time unit scheduling without a separate synchronization. Thus, it is possible to calculate random number level values of the plurality of words at a high processing speed.

Figure 9:
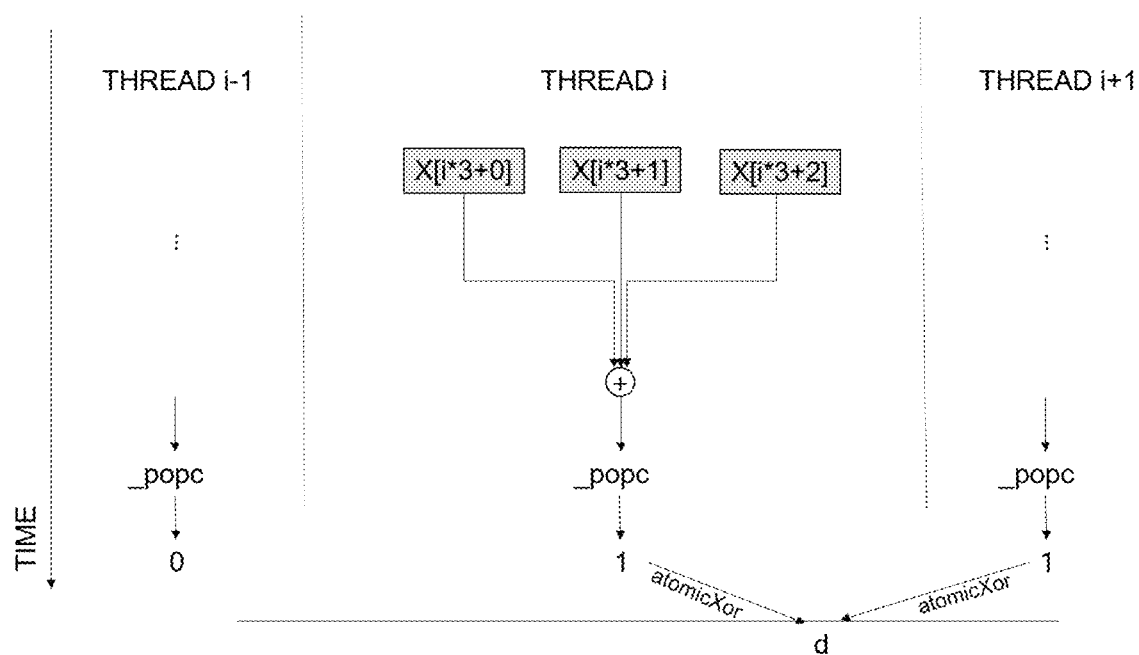
FIG. 9 is a block diagram illustrating a method of collecting random number level values determined by processing consecutive words of a bitstream in parallel through the BM algorithm for verifying randomness of the bitstream according to an embodiment of the present disclosure.

FIG. 9 is a block diagram illustrating a method of collecting random number level values determined when consecutive words 910, 920, and 930 of a bitstream are processed in parallel through the BM algorithm in order to verify randomness of the bitstream according to an embodiment of the present disclosure. In the similar manner to FIG. 8, it is assumed that each three words in one bit block is allocated to each thread i−1, i, and i+1 according to the result calculated according to the above equation. In FIG. 9, _pope may be indicative of a word level parity task, that is, a task for calculating a result value of 1 when the number of the bits in a word is an odd number and a result value of 0 when the number of the bits is an even number. X represents a value calculated through computation (e.g., addition, multiplication, XOR, etc.), and atomicXor, which is a function provided by Nvidia CUDA, may be used to automatically change the given shared variable d. In this case, the shared variable d may be a variable used to verify randomness of a bitstream. For example, d may be calculated using Equation 2 below:

$$d = s_i + \Sigma_{k=1}^{L} c_k s_{(i-k)} (\mathrm{mod}\ 2) = \Sigma_{k=0}^{L} c_k s_{(i-k)} (\mathrm{mod}\ 2) \qquad [\text{Equation 2}]$$

By calculating the shared variable d using the above equation, an $i^{th}$ bit may be generated from C, which is the value of the currently shortest LFSR of an $i^{th}$ bit sequence.

According to an embodiment of the present disclosure, in FIG. 9, an XOR result value for bits of each of the three words may be calculated in one thread i, and _pope of the three XOR result values may be calculated. Then, when _pope is 1, the shared variable d may be changed by performing atomicXor. As such, three words may be processed on one thread executed on one core without separate synchronization or separate resource addition under one-time unit schedule, and thus it is possible to calculate random number level values of the plurality of words at a high processing speed.

Figure 10:
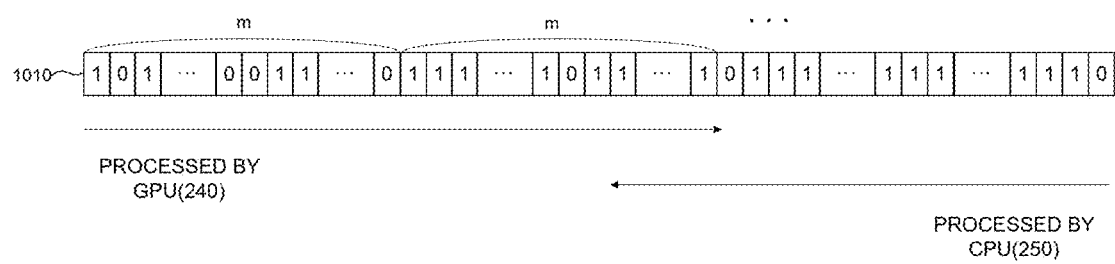
FIG. 10 is a diagram showing a bitstream that has bits processed in parallel to verify randomness through a central processing unit (CPU) and the GPU according to another embodiment of the present disclosure.

FIG. 10 is a diagram showing a bitstream 1010 that has bits processed in parallel to verify randomness through the GPU 240 and the CPU 250 according to an embodiment of the present disclosure. Portions of the given bitstream 1010 may be simultaneously processed using the cores of the GPU 240 and the CPU 250. According to an embodiment of the present disclosure, some of a plurality of bit blocks in the bitstream 1010, each of which consists of m bits, may be allocated to the GPU 240, and the others may be allocated to the CPU 250.

According to an embodiment of the present disclosure, as shown in FIG. 10, a bit sequence (e.g., a bit block or a word) including the first bit of the bitstream 1010 may be allocated to the cores of the GPU 240. At the same time, a bit sequence (e.g., a bit block or a word) including the last bit of the bitstream 1010 may be allocated to the cores of the CPU 250. The bitstream randomness determination module 254 may receive random number level values of bit blocks or words processed by the GPU 240 and random number level values of bit blocks or words processed by the CPU 250 and may verify randomness of the bitstream 1010 using a statistical analysis method. However, the bit sequence including the last bit may be allocated to and processed by the cores of the CPU 250, and the bit sequence including the first bit may be allocated to and processed by the cores of the GPU 240.

According to an embodiment of the present disclosure, the bitstream randomness determination module 254 may periodically check whether the bit sequences being processed by the GPU 240 and CPU 250 do not overlap each other. This overlapping check may be executed by checking the indices of the bit sequences and does not greatly affect the processing speed for verifying the randomness of the entire bitstream.

In general, the randomness verification apparatus described herein may represent various types of devices, such as a wireless phone, a cellular phone, a laptop computer, a wireless multimedia device, a wireless communication personal computer (PC) card, a personal digital assistant (PDA), an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but as an alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For firmware and/or software implementations, the techniques may be embodied as instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage device, etc. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example and not to be limiting, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. The terms "disk" and "disc," as used herein, include a CD, laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. As an alternative, the storage medium may be integral to the processor. The processor and the storage medium may reside in an ASIC. The ASIC may reside in a user terminal. As an alternative, the processor and the storage medium may reside as discrete components in a user terminal.

The preceding description of the disclosure is provided to enable any person skilled in the art to make or use the disclosure. Various modifications to the disclosure will be readily apparent to those skilled in the art, and the generic principles defined herein are applied to other variations without departing from the spirit or scope of the disclosure. Thus, the disclosure is not intended to be limited to the examples described herein but is to be accorded the widest scope consistent with the principles and novel features disclosed herein.

Although exemplary implementations refer to utilizing aspects of the presently disclosed subject matter in the context of one or more stand-alone computer systems, the subject matter is not so limited but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The foregoing methods have been described with specific embodiments but can also be embodied as computer-readable codes on a computer-readable recording medium. The computer-readable recording medium is any type of recording apparatus for storing data which can be read by a computer system. Examples of the computer-readable recording medium include ROM, RAM, CD-ROMs, magnetic tapes, floppy disks, optical data storage devices, etc. Also, the computer-readable recording medium can also be distributed over network coupled computer systems so that the computer readable code is stored and executed in a distributed fashion. Also, functional programs, codes and code segments for accomplishing the example embodiments can be easily construed by programmers skilled in the art to which the present disclosure pertains.

The bitstream randomness verification method according to some embodiments of the present disclosure can greatly improve a processing speed related to whether the randomness of a given bitstream is verified by dividing the bitstream into bit blocks and further words, allocating the bit blocks or words according to a GPU architecture, and processing the bit blocks or words in parallel.

The bitstream randomness verification method according to some embodiments of the present disclosure can greatly reduce a processing time necessary for verification of randomness of a given bitstream by dividing a bitstream into bit blocks or further dividing each bit block into words and processing the bit blocks or the words using both of a GPU and a CPU in parallel.

The bitstream randomness verification method according to some embodiments of the present disclosure can greatly improve a processing speed of the BM algorithm executed in Linear Complexity Test by using parallel processing in implementing the BM algorithm, to verify whether a given bitstream is a random number in Linear Complexity Test.

Although the present disclosure has been described herein in connection with some embodiments, it should be understood by those skilled in the art that various changes and modifications may be made therein without departing the scope of the present disclosure. Also, these changes and modifications should be regarded as falling within the scope of the claims.

What is claimed is:

1. A method of verifying randomness of a bitstream, the method comprising:
   receiving a bitstream consisting of n consecutive bits wherein n is a natural number of two or greater;
   dividing the bitstream into a plurality of bit blocks, wherein each of the bit blocks consists of m consecutive bits and m is a natural number of two or greater and is smaller than n;
   allocating the plurality of bit blocks to a plurality of core groups in a graphics processing unit (GPU), wherein each of the core groups includes a plurality of cores capable of performing identical or similar tasks without separate synchronization;
   processing the plurality of bit blocks allocated in the plurality of core groups in parallel;
   calculating random number level values of the plurality of bit blocks allocated; and
   determining whether the bitstream has randomness based on the calculated random number level values, and
   wherein allocating the plurality of bit blocks to the plurality of core groups in the GPU comprises allocating a portion of the bit blocks to a plurality of cores of a central processing unit (CPU),
   wherein calculating the random number level values of the plurality of bit blocks allocated comprises:
   processing the portion of the plurality of bit blocks allocated to each of the cores of the CPU; and
   calculating random number level values of the portion of the plurality of bit blocks allocated,
   wherein allocating the portion of the bit blocks to the cores of the CPU comprises allocating the portion of the bit blocks to the cores of the CPU in reverse order of the bitstream, and wherein calculating the random number level values of the portion of the plurality of bit blocks allocated comprises checking whether the random number level values of the portion of the plurality of bit blocks allocated are processed in the plurality of core groups of the GPU.

2. The method of claim 1, wherein dividing the bitstream into the plurality of bit blocks comprises dividing each of the bit blocks into a plurality of words wherein each of the words consists of v consecutive bits and v is a multiple of 32 bits.

3. The method of claim 2, wherein allocating the plurality of bit blocks to the plurality of core groups in the GPU comprises allocating at least one of the plurality of words, into which one of the plurality of bit blocks allocated is divided, to a thread executed in each of a plurality of cores of one of the core groups corresponding to the one of the plurality of bit blocks allocated.

4. The method of claim 3, wherein calculating the random number level values of the plurality of bit blocks allocated comprises calculating a random number level value of each of the words.

5. The method of claim 4, wherein determining whether the bitstream has randomness based on the calculated random number level values comprises determining a random level value of the plurality of bit blocks allocated based on the random number level values of the words.

6. The method of claim 1, wherein determining whether the bitstream has randomness based on the calculated random number level values comprises checking whether the random number level values calculated for the bit blocks satisfy a predetermined statistical criterion.

7. The method of claim 3, wherein allocating the at least one of the plurality of words to the thread comprises allocating N words to each of the plurality of cores of the core group corresponding to the one of the plurality of bit blocks allocated, wherein $$N = \left\lceil \frac{\left\lceil \frac{m}{v} \right\rceil + E}{L} \right\rceil$$

where E is 0 if v mod (m mod v) is 0 and E is 1 if v mod (m mod v) is not 0, and L is the number of the cores included in each of the core groups.

* * * * *